(No Model.)

C. H. TAYLOR.
CULTIVATOR.

No. 432,452. Patented July 15, 1890.

Witnesses.
Gorham F. Betts.
Columbus D. Hyatt.

Inventor.
Charles H. Taylor.

UNITED STATES PATENT OFFICE.

CHARLES H. TAYLOR, OF LINCOLN, NEBRASKA.

CULTIVATOR.

SPECIFICATION forming part of Letters Patent No. 432,452, dated July 15, 1890.

Application filed February 23, 1889. Serial No. 300,892. (No model.)

*To all whom it may concern:*

Be it known that I, CHARLES H. TAYLOR, a citizen of the United States, residing at Lincoln, in the county of Lancaster and State of Nebraska, have invented some new and useful Improvements in Cultivator-Shanks and Shovel-Couplings, of which the following is a specification.

The object of my improvements is to afford facilities for a universal adjustment of the shovels and a more positive and reliable means for holding them in their proper position. I attain this object by the mechanism illustrated in the accompanying drawings, in which—

Figure 2:
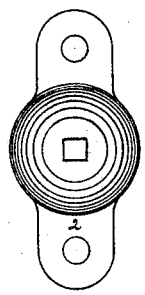
Figure 1:
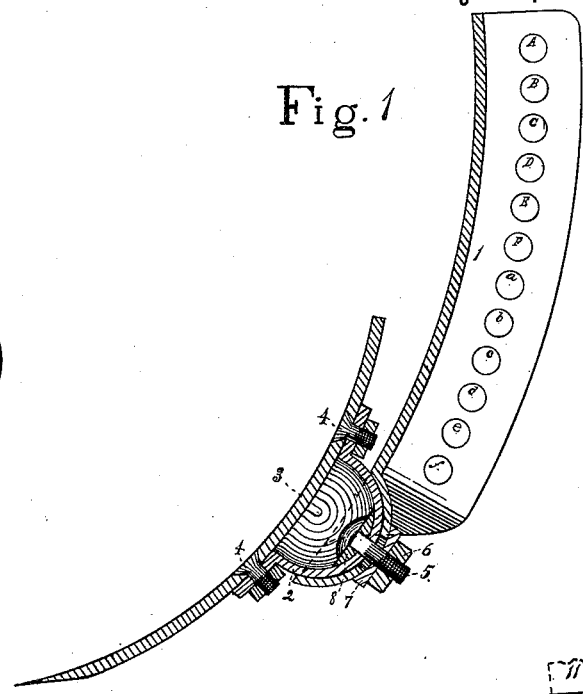
Figure 3:
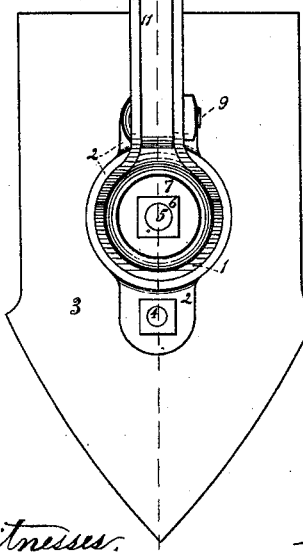
Figure 4:
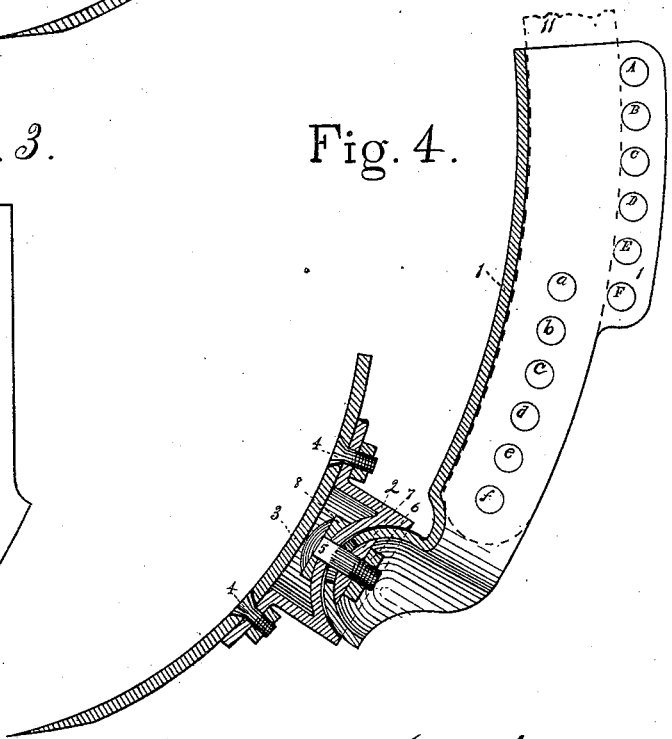

Figure 1 is a vertical section of a cultivator sleeve, shovel, and coupling mechanism constructed on the "ball-and-socket" plan. Fig. 2 is a rear view of that part of the coupling mechanism to which the shovel is attached. Fig. 3 is a rear view of the sleeve, shovel, and coupling as constructed, with the ball and socket reversed and attached to a portion of the cultivator-beam. Fig. 4 is a vertical section of the sleeve, shovel, and coupling mechanism constructed the same as shown in Fig. 3.

Similar letters and numbers refer to similar parts throughout the different views.

The dotted line in Fig. 3 indicates the line on which the sectional views are taken.

The sleeve 1 may be constructed with a series of holes for bolt 9, by means of which the sleeve and shovel may be adjusted vertically and secured to the standard or shank of beam 11, and another series of holes for the break-pin 10, by means of which said break-pin can be set at any desired distance from the bolt. The holes *a b c d e f* are intended for the bolt 9, and the holes A B C D E F are intended for the break-pin 10. When the sleeve 1 and the beam 11 are constructed especially to fit each other, the beam may be provided at its lower end with a hole for the bolt 9 and at a suitable distance above one or more holes for the brake-pin 10, and the holes in the sleeve for the pin 10 may be above on the same line with the holes for bolt 9, as shown in Fig. 1; but when the sleeves 1 are constructed with the intention of sometimes using them on different kinds of cultivators they should be constructed, as shown in Figs. 4 and 3, with the holes for break-pin back far enough so that said pins can pass through behind the beam. The sleeve 1 may be made to fit a straight or a curved beam, as desired.

By the arrangement of the holes in beam 11 and sleeve 1 for bolt 9 and break-pin 10, as above described, the break-pin can be placed in a hole farther from the bolt, and thus the shovel will receive a greater amount of strain or pressure before said pin will break, or the break-pin can be placed in a hole nearer to the bolt, in which case a less amount of strain or pressure on the shovel would cause the break-pin to break, thus permitting said shovel to swing backward and pass over whatever had caused the unusual pressure against it.

The ball-and-socket coupling, by means of which the shovel 3 is secured to the sleeve 1 adjustably, may be constructed in two ways with the same result, as shown in Figs. 1 and 4. In Fig. 1 the back plate 2 forms the ball part of the coupling, and the lower end of the sleeve 1 forms the socket part of coupling. In Figs. 3 and 4 the coupling is shown as constructed with the ball and socket reversed. In both plans the sleeve 1 and the back plate 2 are secured to each other by means of the bolt 5. The bolt 5 is made square near its head, and it passes through a square hole in the center of the back plate 2, by means of which it is prevented from turning.

The sleeve 1 is provided with a round hole for the bolt 5 to pass through, and the hole is made large enough to give the shovel the necessary range of adjustment.

The head of bolt 5 rests on the washer 8, which may be so constructed as to form a part of the back plate 2; but if made independent of the plate 2 one side of it should be formed to fit said plate. The burr 6 of bolt 5 rests on the washer 7, which is large enough to always cover the hole in the sleeve. To the back plate 2 is secured the shovel 3 by means of the bolts 4 4.

The concave part of the coupling is formed on a smaller circle than the convex part, so that when the convex part of the coupling is drawn in the concave or socket part it wedges fast on the sides and does not quite touch the bottom, and by this means the shovel is held firmly in any position.

What I claim as my invention, and desire to secure by Letters Patent, is—

1. A cultivator-sleeve 1, constructed with a series of holes for bolt 9, by means of which the sleeve and shovel can be adjusted vertically and secured to beam 11, and a series of holes for break-pin 10, by means of which the break-pin can be set any desired distance from said bolt, substantially as set forth, and for the purposes specified.

2. A ball-and-socket shovel-coupling constructed with the ball part of the coupling formed on a circle or curve a little larger than that of the socket, substantially as set forth, and for the purpose specified.

3. A ball-and-socket shovel-coupling constructed with the enlarged hole (for the bolt to pass through, and by means of which the shovel is allowed the necessary range of adjustment) formed in that part of the coupling which is attached to or forms a part of the sleeve, and the hole formed in that part of the coupling to which the shovel is attached made of suitable size and shape to make a perfect fit for the bolt, all substantially as set forth, and for the purposes specified.

4. The combination of the cultivator-sleeve 1, the back plate 2, the bolt 5, with nut 6, the washers 7 and 8, and the shovel 3, with suitable bolts or rivets 4 4 to secure said shovel to back plate, all substantially as set forth in the accompanying drawings and specification.

In witness whereof I affix my signature in presence of two witnesses.

CHARLES H. TAYLOR.

Witnesses:
W. E. BAILEY,
W. S. HAMILTON.